J. L. EDELEN.
ANTIRATTLING DEVICE.
APPLICATION FILED JAN. 3, 1922.

1,436,387.

Patented Nov. 21, 1922.
2 SHEETS—SHEET 1.

INVENTOR
JAS. L. EDELEN.
BY
ATTORNEY

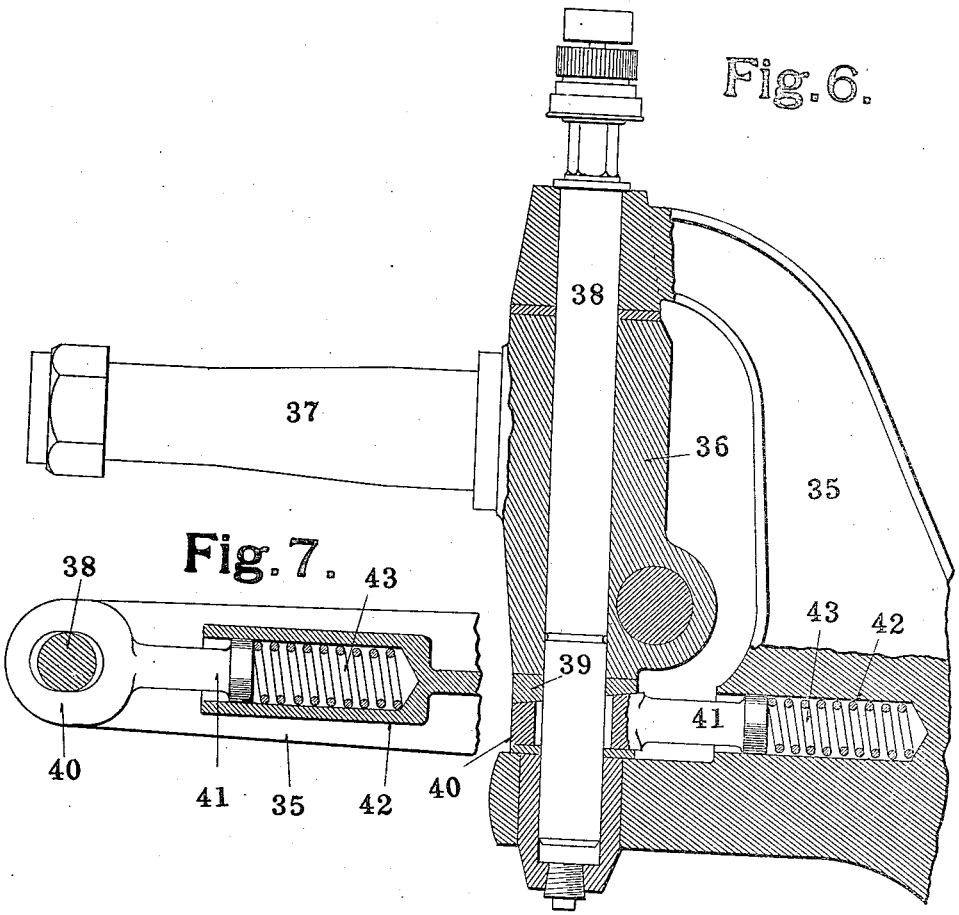

Patented Nov. 21, 1922.

1,436,387

UNITED STATES PATENT OFFICE.

JAMES L. EDELEN, OF ST. LOUIS, MISSOURI.

ANTIRATTLING DEVICE.

Application filed January 3, 1922. Serial No. 526,541.

*To all whom it may concern:*

Be it known that I, JAMES L. EDELEN, a citizen of the United States of America, residing at the city of St. Louis, State of Missouri, United States of America, have invented a certain new and useful Antirattling Device, of which the following is such a full, clear, and exact description as will enable any one skilled in the art to which it appertains to make and use the same, reference being had to the accompanying drawings, forming part of this specification.

My invention relates to an antirattling device and is particularly applicable to the spring suspension and steering knuckles of motor vehicles. It may, however, be used wherever a bearing rotates or oscillates upon a pivot in such a manner that it is desirable to automatically take up the end wear.

Figure 1:
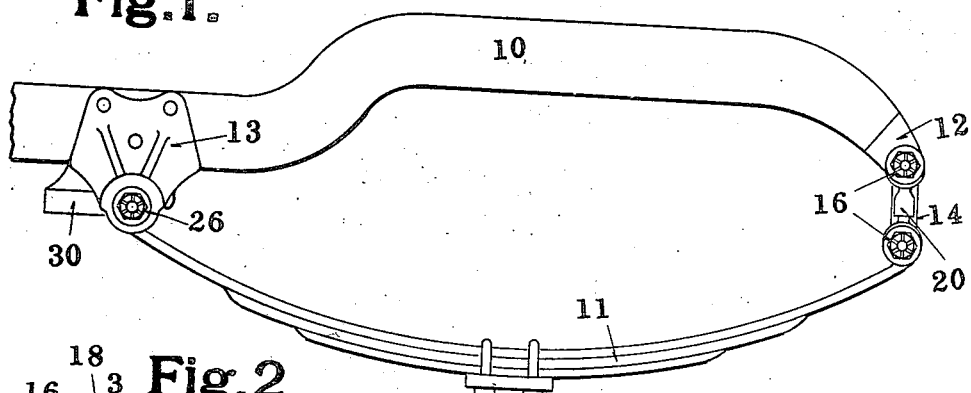
Figure 2:
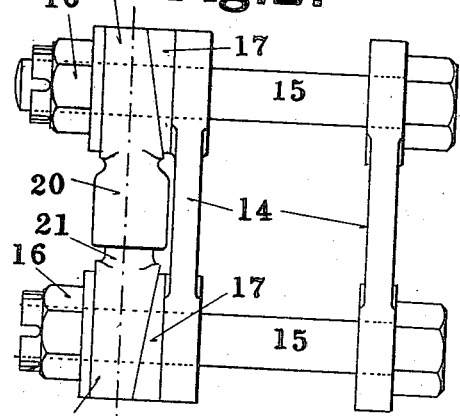
Figure 3:
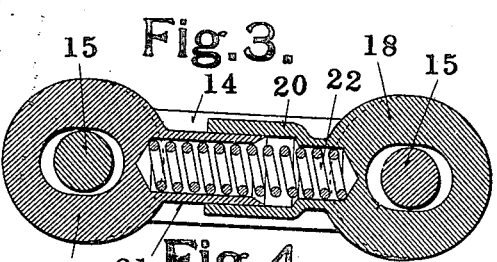
Figure 5:
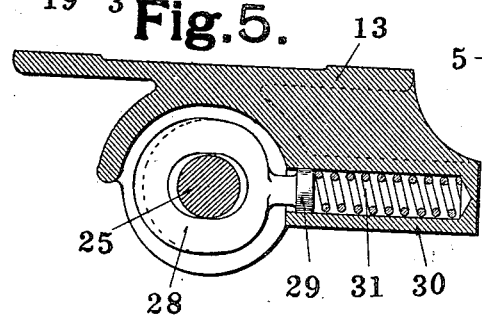
Figure 4:
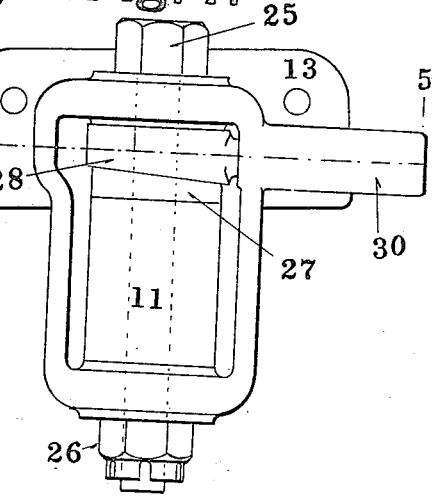

In the accompanying drawings which illustrate some forms of device made in accordance with my invention, Figure 1 is a side elevation of a portion of the frame and one of the springs of the motor vehicle to which my invention is applied. Figure 2 is an enlarged view of the shackle shown at the rear end of Figure 1. Figure 3 is a section taken on the line 3—3 of Figure 2. Figure 4 is a bottom plan view of the bracket shown at the front end of Figure 1, Figure 5 is a section taken on the line 5—5 of Figure 4. Figure 6 is a sectional view showing the steering knuckle of a motor vehicle to which my invention is applied and Figure 7 is a horizontal section through the parts shown in Figure 6.

10 indicates a portion of the frame of a motor vehicle and 11 one of the springs. The frame 10 is provided with a pair of brackets 12 and 13, respectively. The bracket 12 is connected with the rear end of the spring 11 by means of a pair of links 14, the connection being secured by means of bolts 15, one of which passes through the bracket 12 and the other through the loop at the end of the spring 11. The bolts 15 are provided with nuts 16 which may be castellated as shown in the drawings or provided with other suitable locking means. Placed against one of the links 14 and surrounding the bolts 15 are wedge shaped washers 17 one of which contacts with a wedge-shaped piece 18 and the other a similar wedge-shaped piece 19. These pieces 18 and 19 are provided with elongated slots as best shown in Figure 3 so as to allow of movement in a direction transverse to the axis of the bolts 15. The part 18 is provided with a stem 20 and the part 19 with a stem 21 which stems telescope and are made hollow so as to form a casing enclosing a spring 22 (Figure 3) which spring tends to force the members 18 and 19 apart so as to move the link 14 inwardly and thus automatically take up any end wear in the spring or the portion of the bracket 12 surrounding the bolts 15.

Passing through the bracket 13 is a bolt 25 which is provided with a nut 26 and is surrounded by a wedge shaped washer 27 similar to the washers 17 hereinbefore described and with a wedge shaped member 28 similar to one of the members 18 and 19 and like them is provided with an elongated slot so as to allow movement relative to the bolt 25 in a direction transverse to its axis. The member 28 carries a stem 29 entering a barrel 30, preferably formed integral with the bracket 13, and containing a coil spring 31 tending to move the member 28 in such a direction as to take up any end wear in the loop of the spring 11 or the bracket 13.

In Figures 6 and 7, I have shown my device as applied to the steering knuckle of a motor vehicle. In these figures, 35 indicates the knuckle frame and 36 the post carrying the wheel axle 37. Passing through the arms of the frame 35 and the post 36, is a pivot 38 which pivot is surrounded by a wedge shaped member 40 similar to the members 18, 19, and 30 hereinbefore described.

The member 40 is provided with a stem 41 entering a barrel 42 formed in a frame 35 and containing a coil spring 43. This spring acts in the same manner as the springs 22 and 31 hereinbefore described so as to move the member 40 in a direction transverse to the axis of the bolt 38 and thus automatically take up any end wear of the parts.

It will be seen that the construction of my device is such as to automatically take up end wear of the parts to which it is applied and that it is equally applicable to parts having a single and a double bearing, furthermore that the springs for actuating the parts are thoroughly protected from the weather and from the entrance of dirt or dust.

Having fully described my invention what I claim as new and desire to secure by Letters Patent of the United States is:

1. In a device of the class described, the combination with a pivot, of a bearing mounted thereon, a contact member abutting against the end of said bearing and having relative movement with respect thereto in the operation of the device, and a wedge shaped member movable in a direction transverse to the axis of said pivot to automatically compensate for end wear between said bearing and contact member.

2. In a device of the class described, the combination with a pivot pin, of a bearing mounted thereon, a pair of contact members surrounding said pivot pin and abutting against the ends of said bearing and having relative movement with respect thereto in the operation of the device, and a wedge shaped member movable in a direction transverse to the axis of said pivot pin to automatically compensate for wear between the ends of said bearing and said contact members.

3. In a device of the class described, the combination with a pivot, of a bearing mounted thereon, a contact member abutting against the end of said bearing and having relative movement with respect thereto in the operation of the device, and a spring actuated wedge shaped member movable in a direction transverse to the axis of said pivot to compensate for end wear between said bearing and contact member.

4. In a device of the class described, the combination with a pair of pivots, of bearings mounted thereon, a contact member abutting against the end of said bearing and having relative movement with respect thereto in the operation of the device, a pair of oppositely disposed wedge members, and means for moving said wedge members in a direction transverse to the axes of said pivots to compensate for end wear between said bearing and contact member.

5. In a device of the class described, the combination with a pair of pivots, of bearings mounted thereon, a pair of oppositely disposed wedge members carried by telescoping stems, and a spring enclosed by said stems for moving said wedge members in a direction transverse to the axes of the pivots.

6. In a device of the class described, the combination with the pivot pins of a spring shackle, of links connecting said pins, bearings surrounding said pins, a pair of oppositely disposed wedge shaped members movable in a direction transverse to the axis of said pins and bearings, and a spring for moving said members to automatically compensate for the end wear between said bearings and links.

7. In a device of the class described, the combination with the pivot pins of a spring shackle, of links connecting said pins, bearings surrounding said pins, a pair of oppositely disposed wedge shaped members movable in a direction transverse to the axis of said pins and bearings, a spring for moving said member to automatically compensate for the end wear between said bearings and links, and a vertically disposed telescoping housing for said spring, the outer part of said housing being arranged above the inner part thereof.

In testimony whereof, I have hereunto set my hand and affixed my seal.

JAS. L. EDELEN. [L. S.]